(No Model.)

C. E. ALBRO.
GEARING.

No. 264,428. Patented Sept. 19, 1882.

Attest
L. J. Matos

Inventor
Charles E. Albro
By his atty

UNITED STATES PATENT OFFICE.

CHARLES E. ALBRO, OF PHILADELPHIA, PENNSYLVANIA.

GEARING.

SPECIFICATION forming part of Letters Patent No. 264,428, dated September 19, 1882.

Application filed August 2, 1882. (No model.)

*To all whom it may concern:*

Be it known that I, CHARLES E. ALBRO, of the city and county of Philadelphia, and State of Pennsylvania, have invented an Improvement in Gearing, of which the following is a specification.

My invention has reference to worms for worm-wheels; and it consists in forming said worm with teeth which converge to a point corresponding to the center of the worm-wheel it is desired to rotate, the outer enveloping-surface being cylindrical or substantially cylindrical in shape, and the root-surface being curved to correspond with the periphery of the worm-wheel; and in details, all of which are fully set forth in the following specification and shown in the accompanying drawings, which form part thereof.

The object of my invention is to increase the power of worm-wheel gearing, reduce its friction, make it run more uniformly, and render it more easily fitted.

Figure 1:
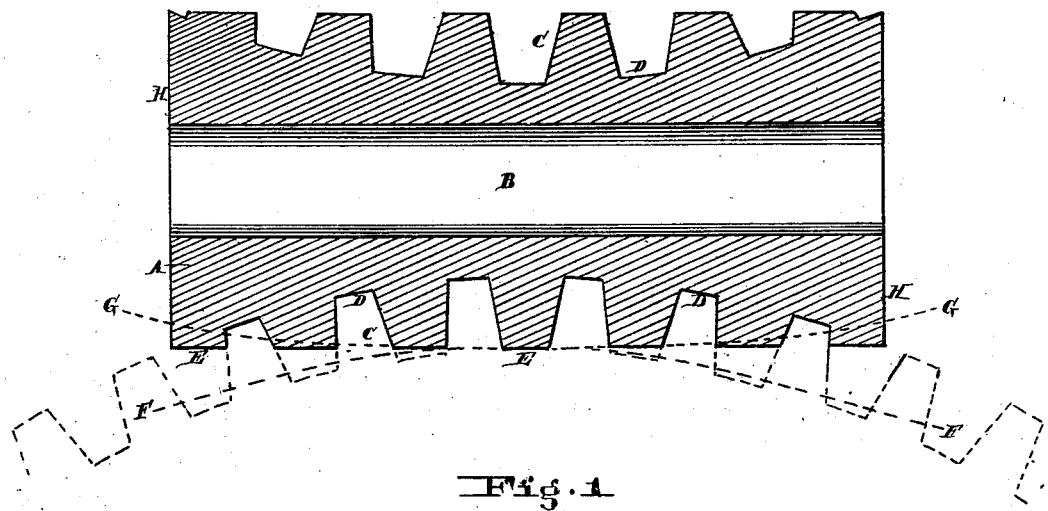
Figure 2:
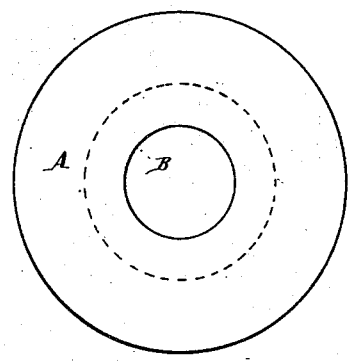

In the drawings, Figure 1 is a sectional elevation of my improved worm, and Fig. 2 is an end elevation of same.

A is the body of the worm. B is the hole for the usual shaft. C are the teeth of the worm, and are made to converge so that their center lines would meet at the center of the worm-wheel the worm is adapted to rotate. The pitch-circle of the worm coincides with the pitch-circle of the worm-wheel, as indicated by dotted line F. The curve D at the roots of the teeth coincides with the periphery of the worm-wheel teeth; but the outer enveloping-surface is substantially cylindrical, as indicated by lines E. By this construction the teeth at the middle of the worm are full and complete, but those toward the ends are cut off, as shown, which construction enables the worm to be readily fitted to the worm-wheel. The length of the worm should be such that the curve D meets the enveloping-surface E and ends H. If desired, the enveloping-surface may be curved, as shown by dotted lines G.

I do not limit myself to the exact enveloping-surface, as it may be cylindrical, convex, or concave, provided in the latter case the curvature is less than the periphery of the worm-wheel, so as to enable the worm to be fitted to the worm-wheel. The vanishing threads enable the gearing to run more uniformly as the teeth gradually find their way into the worm-wheel teeth or the rack, if such a device be used.

Having now described my invention, what I claim as new, and desire to secure by Letters Patent, is—

1. A worm for worm-wheels, &c., which is provided with teeth converging to a point coinciding with the center of the worm-wheel it is adapted to drive, the enveloping-surface of said teeth being substantially cylindrical, as and for the purpose specified.

2. A worm for worm-wheels, &c., having its teeth converge to a point coinciding with the center of the worm-wheel it is adapted to drive, its root-curve corresponding to the periphery of the worm-wheel, and its enveloping surface or plane being substantially cylindrical, as and for the purpose specified.

3. A worm for worm-wheels, &c., in which its pitch-line coincides with the pitch-circle of the worm-wheel it is adapted to drive and its outer or enveloping surface cylindrical or convex, substantially as and for the purpose specified.

4. A worm provided with a thread which vanishes at one or both ends, substantially as and for the purpose specified.

In testimony of which invention I hereunto set my hand.

CHARLES E. ALBRO.

Witnesses:
JOHN W. STEWARD,
R. A. CAVIN.